US008274485B2

(12) United States Patent
Liu et al.

(10) Patent No.: US 8,274,485 B2
(45) Date of Patent: Sep. 25, 2012

(54) TOUCH POSITION DETECTION METHOD FOR TOUCH CONTROL DEVICE

(75) Inventors: Chen-Yu Liu, Jhongli (TW); Chun-Chi Lin, Mailiao Township, Yunlin County (TW)

(73) Assignee: TPK Touch Solutions Inc., Taipei (TW)

( * ) Notice: Subject to any disclaimer, the term of this patent is extended or adjusted under 35 U.S.C. 154(b) by 602 days.

(21) Appl. No.: 12/318,487

(22) Filed: Dec. 30, 2008

(65) Prior Publication Data

US 2010/0079389 A1 Apr. 1, 2010

(30) Foreign Application Priority Data

Sep. 30, 2008 (TW) ................................ 97137456 A

(51) Int. Cl.
G09G 5/00 (2006.01)
G06F 3/041 (2006.01)
G06F 3/045 (2006.01)
G06F 3/044 (2006.01)
G06K 11/06 (2006.01)
G08C 21/00 (2006.01)

(52) U.S. Cl. ..... 345/173; 345/174; 345/156; 178/18.01; 178/18.05; 178/18.06

(58) Field of Classification Search .................. 345/156, 345/157, 173–175, 178; 178/18.01, 18.03, 178/18.05, 18.06

See application file for complete search history.

(56) References Cited

U.S. PATENT DOCUMENTS

| 5,181,030 A | | 1/1993 | Itaya et al. |
|---|---|---|---|
| 5,818,430 A | | 10/1998 | Heiser |
| 5,982,302 A | * | 11/1999 | Ure ................................. 341/22 |
| 2005/0275634 A1 | * | 12/2005 | Chi et al. ...................... 345/173 |
| 2008/0316182 A1 | * | 12/2008 | Antila et al. .................. 345/173 |
| 2009/0322700 A1 | * | 12/2009 | D'Souza et al. .............. 345/174 |

FOREIGN PATENT DOCUMENTS

| CN | 1503195 A | 11/2003 |
|---|---|---|
| EP | 0487049 | 5/1992 |
| JP | 5241717 | 9/1993 |
| JP | 2000112642 | 4/2000 |
| JP | 2001134382 | 5/2001 |

OTHER PUBLICATIONS

A communication from the European Patent Office dated Jul. 29, 2009 with regard to a counterpart foreign application.

* cited by examiner

Primary Examiner — Bipin Shalwala
Assistant Examiner — Ilana Spar
(74) Attorney, Agent, or Firm — Gokalp Bayramoglu; Anna Tsang

(57) ABSTRACT

Disclosed is a touch position detection method for a touch control device, which employs a preset scan detection mode to carry out driving and scan detection on first and second conductive layers through a control circuit. When touch on a touch panel is detected, the type of the touch is determined, which may include a single-point touch, a continuous trace, and a multiple-point touch, and first and second operation modes are selectively used to perform driving and scan detection on the first and second conductive layers of the touch panel to thereby detect coordinates of the touch points or the continuous trace.

20 Claims, 7 Drawing Sheets

TOUCH POSITION DETECTION METHOD FOR TOUCH CONTROL DEVICE

FIELD OF THE INVENTION

The present invention relates to a touch position detection method, and in particular to a method that determines the type of touch of a touch panel to be either a single-point touch, a continuous trace, or a multiple-point touch and selectively employs a corresponding operation mode to perform driving and scanning on the touch panel for coordinates detection.

BACKGROUND OF THE INVENTION

A conventional touch panel includes a first substrate with a first conductive layer and a second substrate with a second conductive layer. The first and second substrates are spaced from each other by insulation spacers therebetween. When a user touches the touch panel, variation of voltage at the touched site is used for the calculation and determination of the position coordinates of the touched site by a microprocessor with known formulas.

The first and second conductive layers can be of a continuous planar structure, or can alternatively be of a structure comprised of a plurality of elongate conductive strips. For different structures of the conductive layers, the position coordinates of a touched site on the touch panel can be determined by using different methods of scanning and different formulas.

In the known techniques of using the structure comprised of elongate conductive strips, such as US Patent Publication No. 2005/0275634, which describes a resistive scanning touch panel, which can detect multiple touched sites by employing scanning techniques. The resistive scanning touch panel comprises a first conductive layer and a second conductive layer, of which the first conductive layer is comprised of a plurality of conductive strips running parallel in a first direction and the second conductive layer is comprised of a plurality of conductive strips running parallel in a second direction, and a controller. The operation principle of the patent is that the controller first applies a voltage to the conductive strips of the first conductive layer and simultaneously detects a voltage difference between opposite ends of the conductive strips of the second conductive layer to determine the coordinate of a touch point in the first direction. Then, a voltage is applied to the conductive strips of the second conductive layer and simultaneously, a voltage difference between opposite ends of the conductive strips of the first conductive layer is detected to determine the coordinate of the touch point in the second direction. These processes of applying voltage at one conductive layer and obtaining signal from the other conductive layer are repeatedly and alternately performed at the first and second conductive layers.

Another example is U.S. Pat. No. 5,181,030, which teaches detection of a sensing signal by applying a voltage to an end of a first conductive layer and grounding an opposite end to establish a potential gradient distribution and further applying a voltage to an end of each of elongate conductive strips of a second conductive layer and connecting an opposite end to a signal sensing circuit.

Further, Chinese Invention Publication CN1503195A discloses applying a drive voltage to an end of each of elongate conductive strips of a first conductive layer and connecting an end of each of elongate conductive strips of a second conductive layer to a scan detection circuit to perform signal scanning.

SUMMARY OF THE INVENTION

Although various patterns and structures of first and second conductive layers of a touch panel, as well as scan detection methods for detecting touched sites of multiple point touches, are disclosed in the prior art references, which allow the detection of touched sites of multiple touch points, yet for applications of stylus writing input, when a user performs a writing on a touch panel with a stylus, the input of the stylus writing is a continuous trace. When the known techniques are employed to detect the continuous trace of stylus writing input, the detected result is a discontinuous trace of stylus writing. Further, the prior arts do not teach to determine if the touch operation applied to a touch panel is single-point touch, multiple-point touch, or continuous trace. Thus, such known techniques are still insufficient to meet the practical requirements for applications of the related products.

Thus, an objective of the present invention is to provide a touch position detection method for a touch control device, which identifies different types of touch operations on a touch panel and detects coordinates of one or more touched sites by a user.

Another objective of the present invention is to provide a touch position detection method for a touch control device, which initializes different operation modes corresponding to the input from a touch panel that may comprise a single-point touch, a multiple-point touch, or a continuous trace to detect coordinates of each touch point.

In accordance with the present invention, a solution to the above problems is to employ a preset scan detection mode to carry out driving and scan detection on first and second conductive layers of a touch panel through a control circuit. When touch applied to the touch panel is detected, the present invention determines the type of the touch, which may include a single-point touch, a continuous trace, and a multiple-point touch, and initializes first and second operation modes corresponding to the type of the touch to perform driving and scan detection on the first and second conductive layers of the touch panel to thereby detect coordinates of the touch point(s) or the continuous trace.

In an embodiment of the present invention, the first conductive layer of the touch panel can be a continuous planar structure or comprised of a plurality of elongate conductive strips formed on a first substrate and the second conductive layer of the touch panel is comprised of a plurality of elongate conductive strips formed on a second substrate. A control circuit is electrically connected to the first and second conductive layers.

The technical solution taken in the present invention allows a conventional resistive type touch control device to not only detect the coordinates of multiple touch points, but also to switch to different operation modes corresponding to different situations of the detection of coordinates to be thereby capable to detect coordinates for various types of touch, including a single-point touch, a multiple-point touch, and a continuous trace constituting an input of stylus writing. Thus, the method of the present invention can both be used to detect coordinates of a single-point touch and a multiple-point touch and be suitable for detection of coordinates of touched sites in a stylus writing application.

BRIEF DESCRIPTION OF THE DRAWINGS

The present invention will be apparent to those skilled in the art by reading the following description of the best mode for carrying out the present invention, with reference to the attached drawings, in which.

DETAILED DESCRIPTION OF THE PREFERRED EMBODIMENTS

Figure 1:
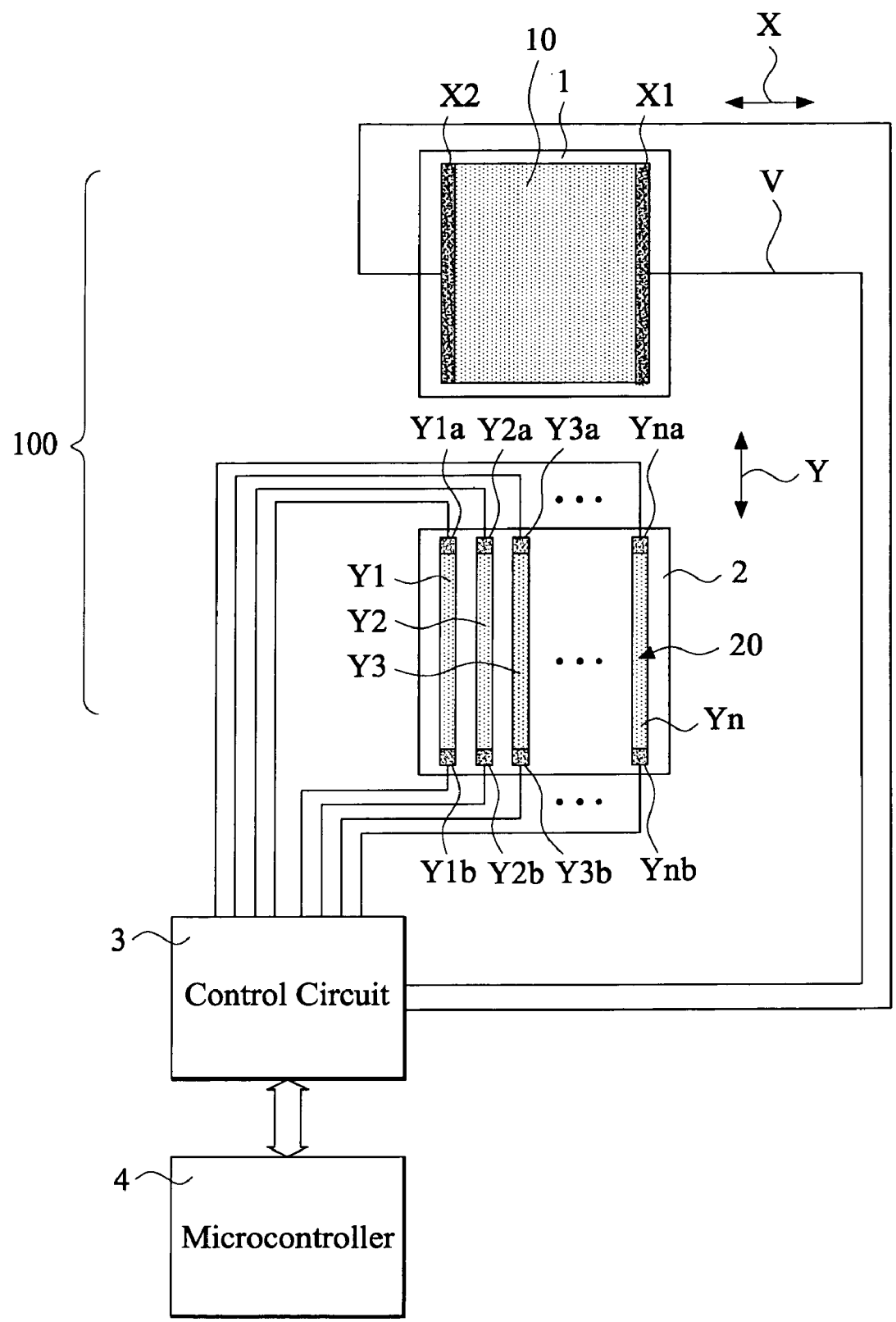
FIG. 1 a system block diagram of a touch control device in accordance with the present invention.
Figure 2:
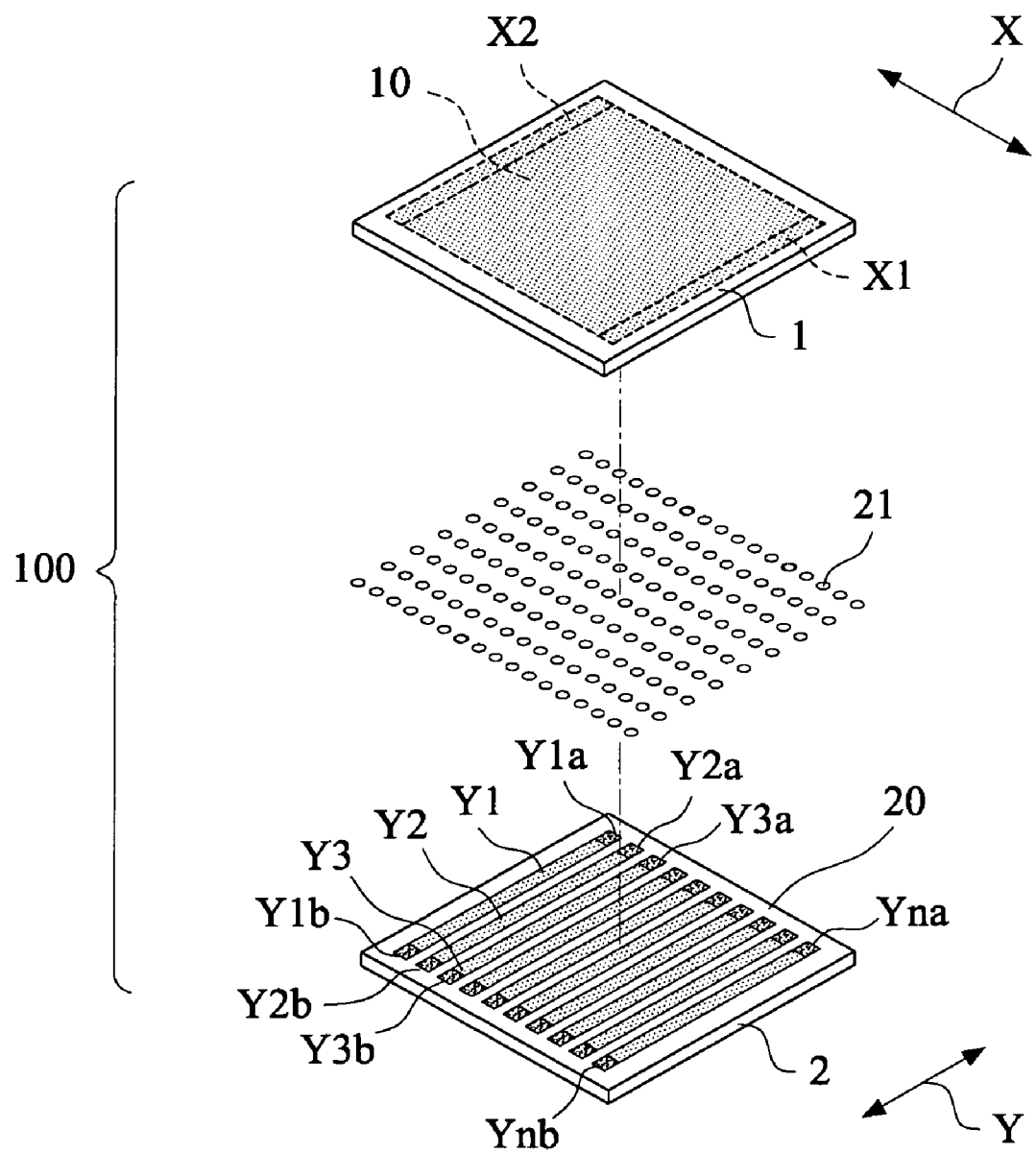
FIG. 2 is an exploded view illustrating a first conductive layer opposing a second conductive layer and spaced from each other by a plurality of insulation spacers when the first and second substrates of FIG. 1 are assembled together.

With reference to the drawings and in particular to FIG. 1, which illustrates a system block diagram of a touch control device in accordance with the present invention, the touch control device comprises a touch panel, which, generally designated at 100, comprises a first substrate 1 and a second, opposite substrate 2. The first substrate 1 has an under surface on which a first conductive layer 10 is formed in a continuous planar structure. The second substrate 2 has a top surface on which a second conductive layer 20 is formed. The first substrate 1 and the second substrate 2 are assembled together in a face-to-face manner with the first conductive layer 10 opposing the second conductive layer 20 and spaced from each other by a plurality of insulation spacers 21 (see FIG. 2).

The first conductive layer 10 has opposite ends in a first direction X, which are respectively referred to as first end X1 and second end X2, both being electrically connected to a control circuit 3.

The second conductive layer 20 comprises a plurality of elongate conductive strips Y1, Y2, Y3, . . . , Yn, which are substantially parallel with but do not engage each other. Each elongate conductive strip Y1, Y2, Y3, . . . , Yn is extended in a second direction Y on the top surface of the second substrate 2.

Each elongate conductive strip Y1, Y2, Y3, . . . , Yn of the second conductive layer 20 has a first end Y1a, Y2a, Y3a, . . . , Yna and a second end Y1b, Y2b, Y3b, . . . , Ynb, both being electrically connected to the control circuit 3.

The control circuit 3 is electrically connected to a microcontroller 4 which controls the operation of the control circuit 3 and receives signals from the control circuit 3.

In FIG. 1, the first conductive layer 10 of the first substrate 1 and the elongate conductive strips Y1, Y2, Y3, . . . , Yn of the second substrate 2, both constituting the touch panel 100, can be replaced with each other so that the first substrate 1 is formed with a structure comprising a plurality of elongate conductive strips while the second substrate 2 provides a structure of continuous planar conductive layer.

For example, the first conductive layer 10 of the touch panel 100 is first used as a drive layer with the first end X1 of the first conductive layer 10 being applied with a drive voltage V (such as 5V) by the control circuit 3 and the second end X2 of the first conductive layer 10 is controlled by the control circuit 3 to connect to a predetermined voltage level, which can be ground voltage, zero voltage, or any fixed-value voltage, whereby a potential gradient is established in the first conductive layer 10. When the touch panel 100 is touched/depressed, the second conductive layer 20 of the touch panel 100 functions as a scan detection layer and the control circuit 3 carries out scan detection on the second conductive layer 20 sequentially through the first ends Y1a, Y2a, Y3a, . . . , Yna of the elongate conductive strips Y1, Y2, Y3, . . . , Yn of the second conductive layer 20, or alternatively, scan detection is carried out sequentially through the first ends Y1a, Y2a, Y3a, . . . , Yna and second ends Y1b, Y2b, Y3b, . . . , Ynb of the elongate conductive strips Y1, Y2, Y3, . . . , Yn, or further alternatively, scan detection is simultaneously performed at both ends of each elongate conductive strip Y1, Y2, Y3, . . . , Yn but sequentially through all the elongate conductive strips Y1, Y2, Y3, . . . , Yn. A variation of voltage in the second conductive layer 20 is thus obtained and, based on such a variation of voltage, coordinates of a touch point can be calculated.

Then, the second conductive layer 20 of the touch panel 100 is used as the drive layer, whereby the control circuit 3 applies a drive voltage V (such as 5V) to the first end Y1a, Y2a, Y3a, . . . , Yna of each elongate conductive strip Y1, Y2, Y3, . . . , Yn and the second ends Y1b, Y2b, Y3b, . . . , Ynb of the elongate conductive strips Y1, Y2, Y3, . . . , Yn are controlled by the control circuit 3 to connect to a predetermined voltage level, which can be ground voltage, zero voltage, or any fixed-value voltage, whereby a potential gradient is established in the second conductive layer 20. The first conductive layer 10 of the touch panel 100 then functions as a scan detection layer and the control circuit 3 performs detection on the first conductive layer 10. A variation of voltage occurring in the first conductive layer 10 can thus be obtained and, based on such a variation of voltage, coordinates of a touch position can be calculated.

Figure 3:
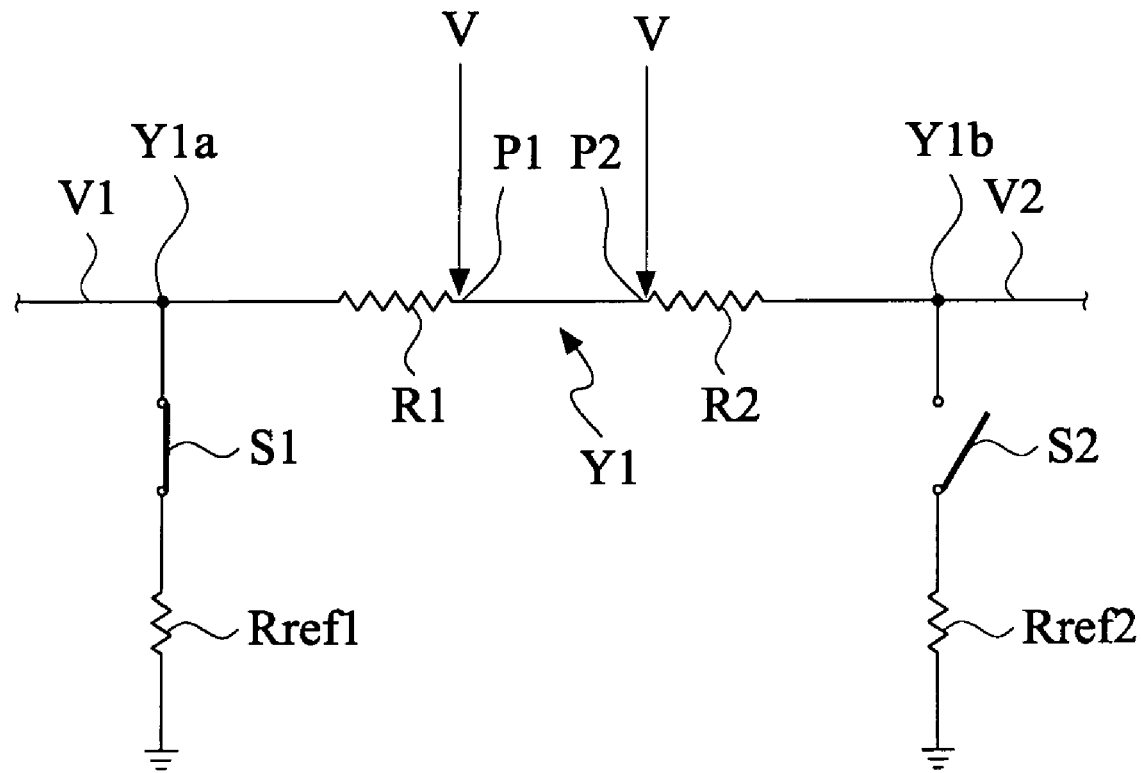
FIG. 3 illustrates an equivalent circuit when two touch points P1, P2 on the elongate conductive strip Y1 are simultaneously touched.

FIG. 3 illustrates an equivalent circuit when two touch points on the elongate conductive strip Y1 are simultaneously touched/depressed. With simultaneous reference to FIG. 1, when the first conductive layer 10 is subjected to touch at multiple points (such as touch points P1 and P2), the drive voltage V of the first conductive layer 10 is applied to the elongate conductive strip Y1 of the second conductive layer 20. When the control circuit 3 performs scan detection on the first end Y1a of the elongate conductive strip Y1 (equivalent to the condition where switch S1 is closed and switch S2 is open), a detection voltage $V1=V \times Rref1/(R1+Rref1)$ is obtained at the first end Y1a of the elongate conductive strip Y1, where V is the provided preset drive voltage. When the control circuit 3 performs scan detection on the second end Y1b of the elongate conductive strip Y1 (equivalent to the condition where switch S1 is open and switch S2 is closed), a detection voltage $V2=V \times Rref2/(R2+Rref2)$ is obtained at the second end Y1b of the elongate conductive strip Y1. In this way, the coordinates of the two touch points P1, P2 of touch on the elongate conductive strip Y1 can be simultaneously obtained.

Figure 4:
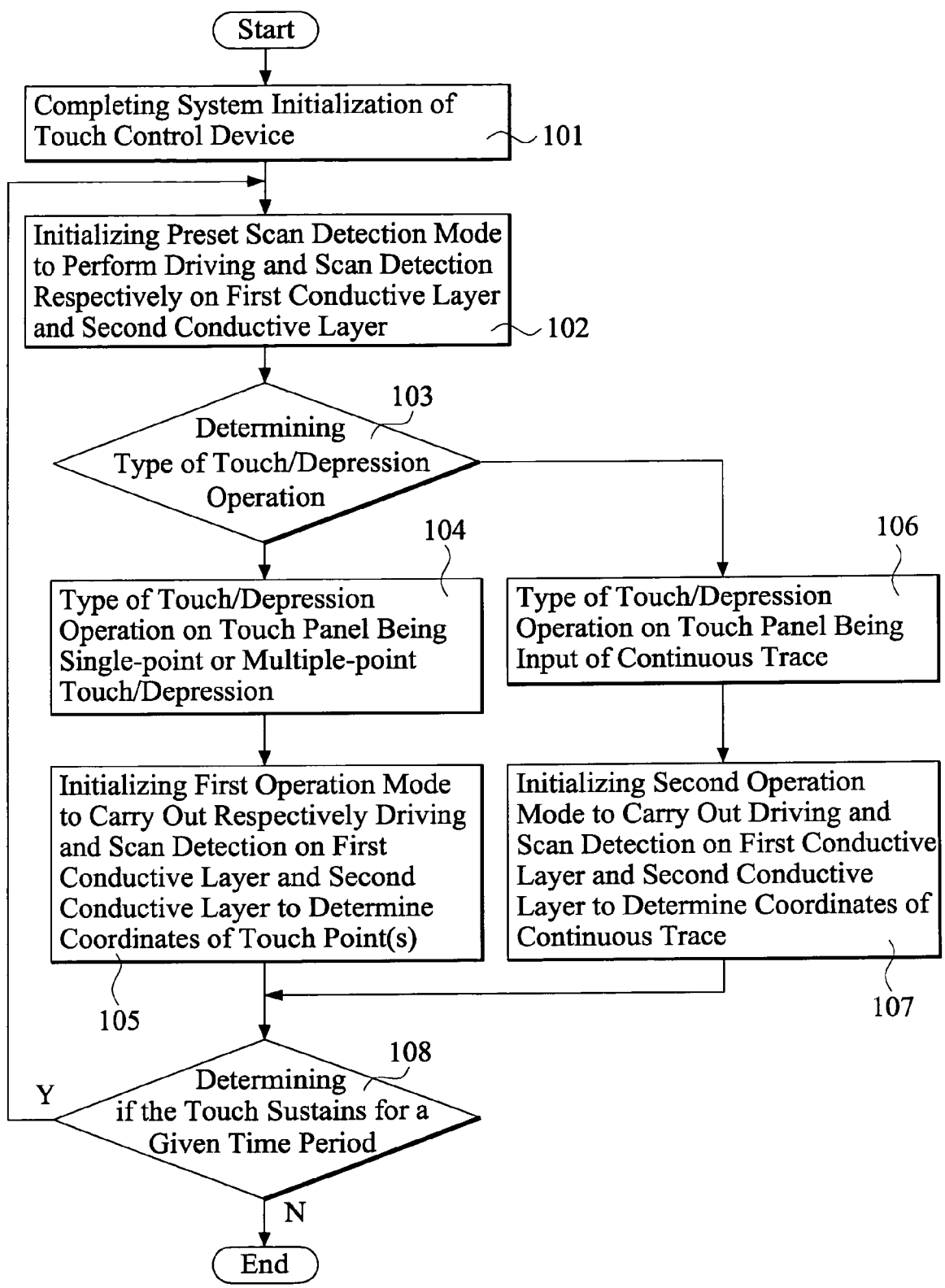
FIG. 4 illustrates a flow chart of a detection method carried out in accordance with a first embodiment of the present invention.

Referring to FIG. 4, which illustrates a flow chart of a detection method carried out in accordance with a first embodiment of the present invention, after system initialization of the touch control device is completed (step 101), the microcontroller 4 initializes a preset scan detection mode to perform driving and scan detection respectively on the first conductive layer 10 and the second conductive layer 20 (step 102).

The preset scan detection mode includes a first operation mode and a second operation mode. In practice, one of these two operation modes can be selected as the preset scan detection mode.

When the first operation mode is selected as the preset scan detection mode, the following steps are carried out: The control circuit 3 applies a drive voltage to the first conductive layer 10 and carries out scan detection on at least one end of the first end Y1a, Y2a, Y3a, . . . , Yna and the second end Y1b, Y2b, Y3b, . . . , Ynb of each elongate conductive strip Y1, Y2, Y3, . . . , Yn of the second conductive layer 20.

When the second operation mode is selected as the preset scan detection mode, the following steps are carried out: The control circuit 3 applies a drive voltage to the first end X1 of the first conductive layer 10 and the second end X2 of the first conductive layer 10 is controlled by the control circuit 3 to connect to a preset voltage level, which can be ground voltage, zero voltage, or any fixed-value voltage, so as to establish a potential gradient in the first conductive layer 10. At the same time, the control circuit 3 carries out scan detection on at least one end of the first end Y1a, Y2a, Y3a, . . . , Yna and the second end Y1b, Y2b, Y3b, . . . , Ynb of each elongate conductive strip Y1, Y2, Y3, . . . , Yn of the second conductive layer 20. Thereafter, the control circuit 3 applies a drive voltage to the first ends Y1a, Y2a, Y3a, . . . , Yna of the second conductive layer 20 and the second ends Y1b, Y2b, Y3b, . . . , Ynb of the second conductive layer 20 are controlled by the control circuit 3 to connect to a preset voltage level, which can be ground voltage, zero voltage, or any fixed-value voltage, so as to establish a potential gradient in the second conductive layer 20, and meanwhile, scan detection is carried out on the first conductive layer 10. These steps are then repeated.

When a user touches the touch panel, the microcontroller 4 determines the type of the touch operation (step 103). If it is determined that the type of touch operation applied to the touch panel is a single-point or a multiple-point touch (step 104), the microcontroller 4 initializes the first operation mode to carry out respectively driving and scan detection on the first conductive layer 10 and the second conductive layer 20 to determine the coordinates of the touch point(s) (step 105).

If it is determined that the type of touch operation applied to the touch panel is an input of a continuous trace (step 106), the microcontroller 4 initializes the second operation mode to carry out driving and scan detection on the first conductive layer 10 and the second conductive layer 20 to determine the coordinates of the continuous trace (step 107).

Finally, it is determined if the touch sustains for a given time period (step 108) and if yes, the process goes back to step 102, otherwise the process ends.

In the step 102 discussed above, when the microcontroller 4 uses the preset scan detection mode to carry out driving and scan detection on the first conductive layer 10 and the second conductive layer 20 respectively, if the preset scan detection mode is the first operation mode, the coordinates of the single or multiple touch point(s) can be simultaneously obtained during the scan detection operation, and if the preset scan detection mode is the second operation mode, the coordinates of the continuous trace can be simultaneously obtained during the scan detection operation.

Figure 5:
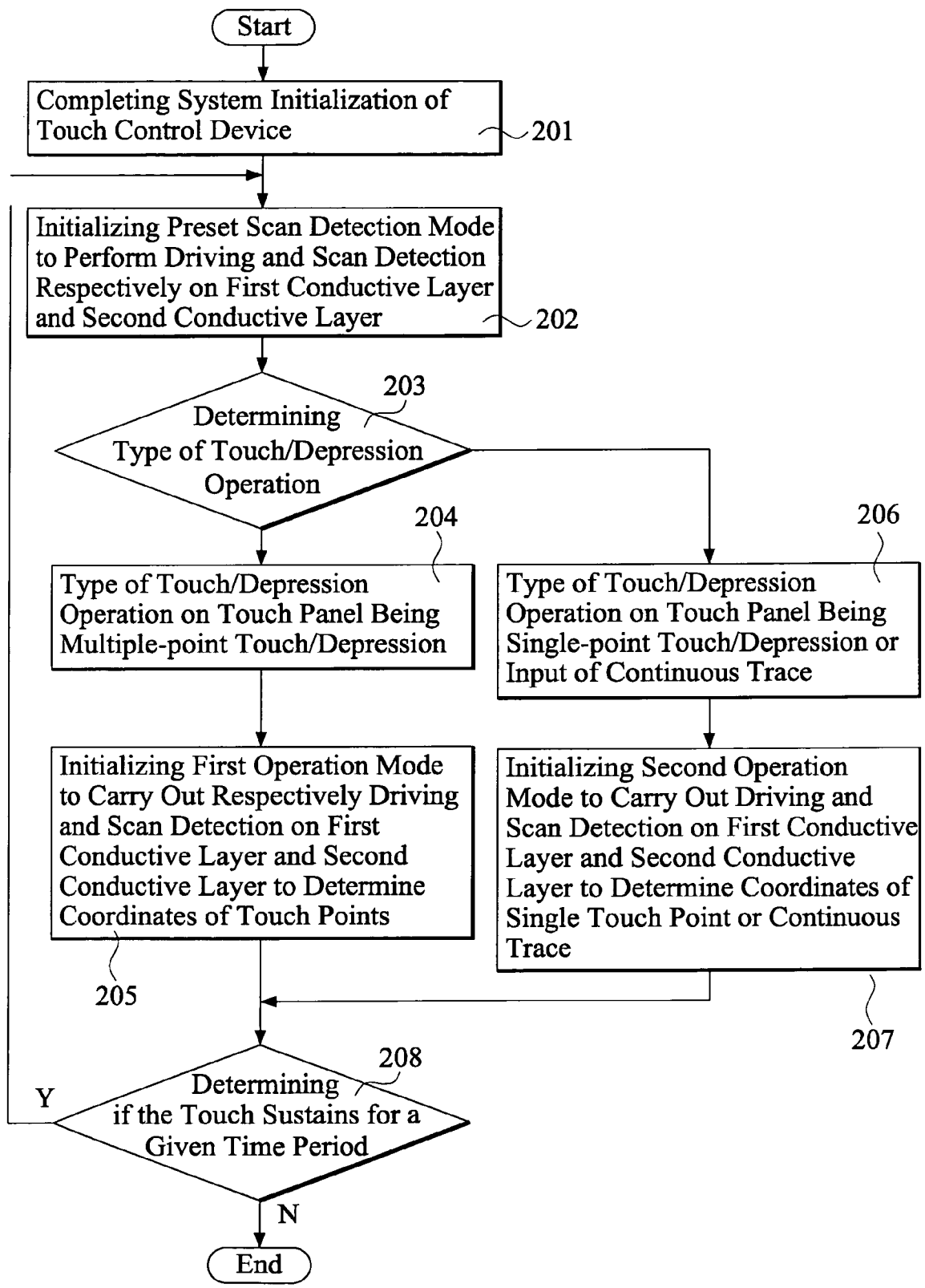
FIG. 5 illustrates a flow chart of a detection method carried out in accordance with a second embodiment of the present invention.

Referring to FIG. 5, which illustrates a flow chart of an operation carried out in accordance with a second embodiment of the present invention, in the instant embodiment, after system initialization of the touch control device is completed (step 201), the microcontroller 4 initializes a preset scan detection mode to perform driving and scan detection respectively on the first conductive layer 10 and the second conductive layer 20 (step 202).

The preset scan detection mode includes a first operation mode and a second operation mode. In practice, one of these two operation modes can be selected as the preset scan detection mode. The detailed operation flows associated with the first and second operation modes are identical to those of the first embodiment.

When a user touches the touch panel, the microcontroller 4 determines the type of the touch operation (step 203). If it is determined that the type of touch operation applied to the touch panel is a multiple-point touch (step 204), the microcontroller 4 initializes the first operation mode to carry out driving and scan detection on the first conductive layer 10 and the second conductive layer 20 to determine the coordinates of the touch points (step 205).

If it is determined that the type of touch operation applied to the touch panel is a single-point touch or an input of a continuous trace (step 206), the microcontroller 4 initializes the second operation mode to carry out driving and scan detection on the first conductive layer 10 and the second conductive layer 20 to determine the coordinates of the single touch point or the coordinates of the continuous trace (step 207).

Finally, it is determined if the touch sustains for a given time period (step 208) and if yes, the process goes back to step 202, otherwise the process ends.

In the step 202 discussed above, when the microcontroller 4 uses the preset scan detection mode to carry out driving and scan detection on the first conductive layer 10 and the second conductive layer 20 respectively, if the preset scan detection mode is the first operation mode, the coordinates of the multiple touch points can be simultaneously obtained during the scan detection operation, and if the preset scan detection mode is the second operation mode, the coordinates of the single touch point or those of the continuous trace can be simultaneously obtained during the scan detection operation.

Figure 6:
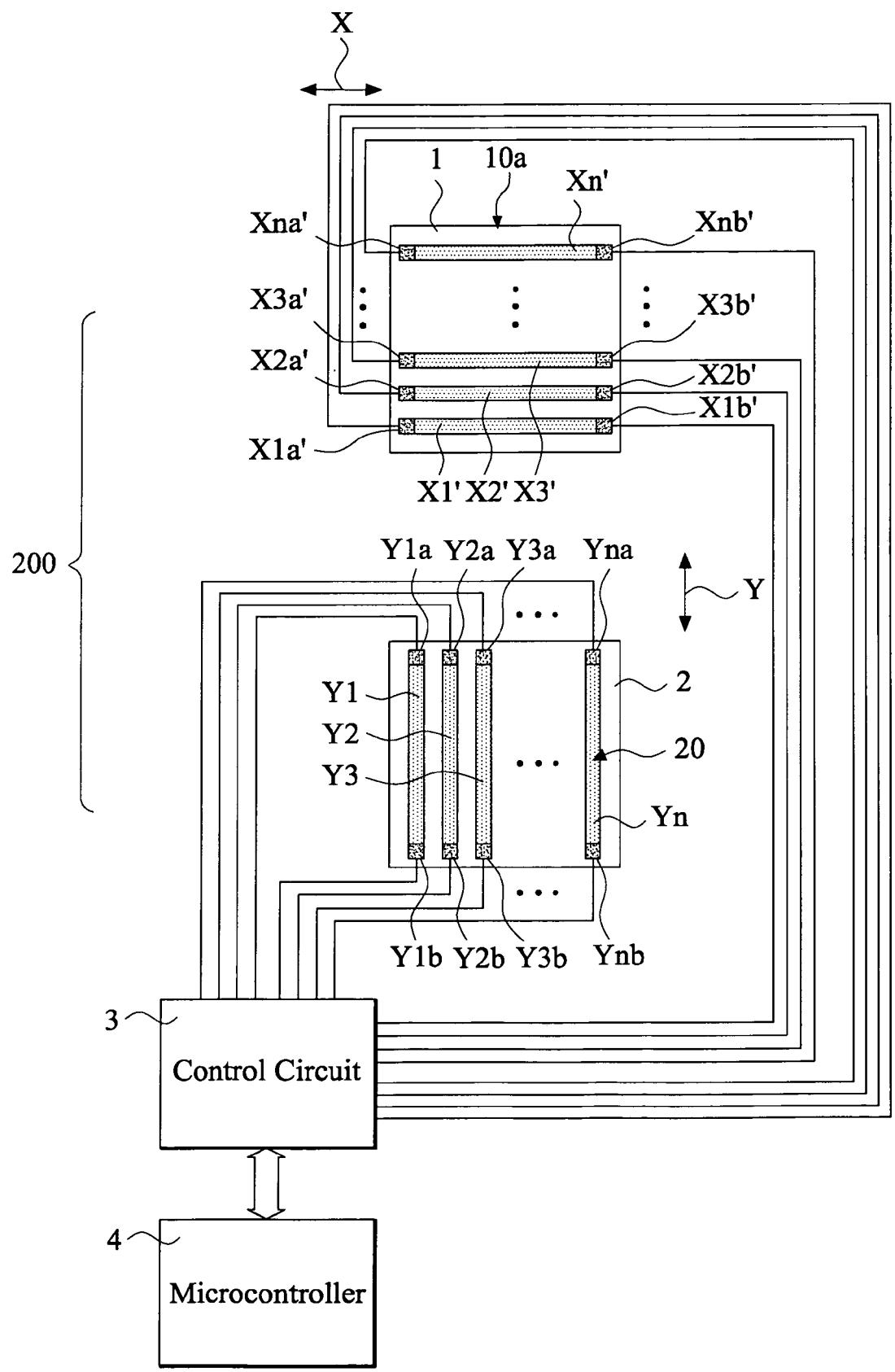
FIG. 6 illustrates a system block diagram in accordance with another embodiment of the present invention.

Referring to FIG. 6, which illustrates a system block diagram in accordance with a different embodiment from the touch control device of FIG. 1, a touch panel, generally designated at 200, comprises a first substrate 1 and a second, opposite substrate 2. The first substrate 1 has an under surface on which a first conductive layer 10a is formed. The first conductive layer 10a comprises a plurality of elongate conductive strips X1', X2', X3', . . . , Xn', which are substantially parallel with but do not engage each other. Each elongate conductive strip X1', X2', X3', . . . , Xn' extends in a first direction X on the under surface of the first substrate 1.

The second substrate 2 has a top surface on which a second conductive layer 20 is formed. The second conductive layer 20 comprises a plurality of elongate conductive strips Y1, Y2, Y3, . . . , Yn, which are substantially parallel with but do not engage each other. Each elongate conductive strip Y1, Y2, Y3, . . . , Yn extends in a second direction Y on the top surface of the second substrate 2.

Figure 7:
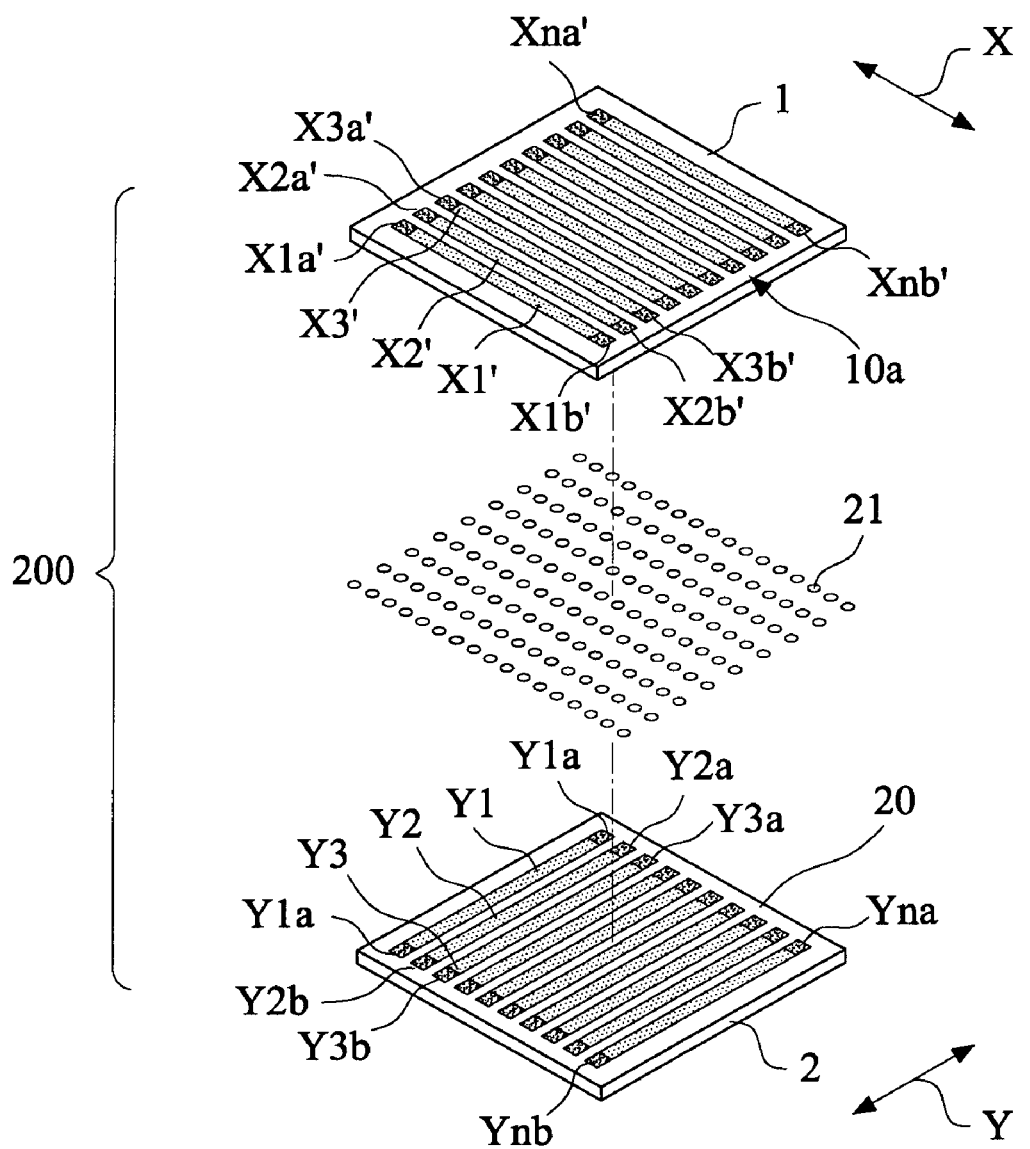
FIG. 7 is an exploded view illustrating a first conductive layer opposing a second conductive layer and spaced from each other by a plurality of insulation spacers when the first and second substrates of FIG. 6 are assembled together.

The first substrate 1 and the second substrate 2 are assembled together with the first conductive layer 10a opposing the second conductive layer 20 and spaced from each other by a plurality of insulation spacers 21 (see FIG. 7).

Each elongate conductive strip X1', X2', X3', . . . , Xn' of the first conductive layer 10a has a first end X1a', X2a', X3a', . . . , Xna' and a second end X1b', X2b', X3b', . . . , Xnb', which are electrically connected to the control circuit 3.

Each elongate conductive strip Y1, Y2, Y3, . . . , Yn of the second conductive layer 20 has a first end Y1a, Y2a, Y3a, . . . , Yna and a second end Y1b, Y2b, Y3b, . . . , Ynb, which are electrically connected to the control circuit 3.

The system structure of this instant embodiment is similar to that of the embodiment illustrated in FIG. 1 and a significant difference is that the touch panel 200 is considered an equivalent variation of the touch panel 100 illustrated in the embodiment of FIG. 1. The principle and steps of the operation of the instant embodiment are similar to those of the previously described embodiment and thus details thereof are omitted here for simplicity.

Although the present invention has been described with reference to the best mode for carrying out the present invention, it is apparent to those skilled in the art that a variety of modifications and changes may be made without departing from the scope of the present invention which is intended to be defined by the appended claims.

What is claimed is:

1. A touch position detection method for use in a touch control device that comprises a touch panel, the touch panel comprising a first conductive layer and a second conductive layer, the first conductive layer comprising a continuous planar structure formed on a first substrate and having first and second ends, the second conductive layer comprising a plurality of elongate conductive strips formed on a second substrate, the elongate conductive strips being substantially parallel to and not engaging each other, each elongate conductive strip having first and second ends, the first and second substrates being spaced from each other by insulation spacers, a control circuit electrically connected to the first and second conductive layers, and a microcontroller electrically connected to the control circuit, the method comprising the following steps:
   (a) the microcontroller initializing a preset scan detection mode to carry out driving and scan detection on the first conductive layer and the second conductive layer through the control circuit;
   (b) when detecting a touch operation on the touch panel, determining if the type of touch applied to the touch panel is multiple-point touch, continuous trace, or single-point touch;
   (c) when the type of touch being determined to be the single-point touch or multiple-point touch, the microcontroller employing a first operation mode to carry out driving on the first conductive layer and the second conductive layer as well as simultaneously performing the scan detection at said second conductive layer to detect the coordinates of the absolute touch position/touch positions,
   (d) when the type of touch being determined to be the continuous trace, the microcontroller employing a second operation mode to carry out driving on the first conductive layer and the second conductive layer and performing the scan detection at said second conductive layer to detect coordinates of the absolute touch positions of the continuous trace; wherein said control circuit establishes a potential gradient in said first conductive layer or said second conductive layer when it is used as driving layer;
   (e) determining if the touch operation sustains for a given time period; and (f) returning to step (a) when the touch operation sustains for the given time period.

2. The method as claimed in claim 1, wherein the first operation mode comprises the following steps: (c1) applying a drive voltage to the first conductive layer; and (c2) carrying out scan detection on at least one end of the first and second ends of each elongate conductive strip of the second conductive layer.

3. The method as claimed in claim 1, wherein the second operation mode comprises the following steps: (d1) applying a drive voltage to the first end of the first conductive layer, the second end of the first conductive layer being connected to a preset voltage level to thereby establish a potential gradient in the first conductive layer, and at the same time, carrying out scan detection on at least one end of the first and second ends of each elongate conductive strip of the second conductive layer; (d2) applying a drive voltage to the first end of each elongate conductive strip of the second conductive layer, the second end of each elongate conductive strip of the second conductive layer being connected to a preset voltage level to thereby establish a potential gradient in the second conductive layer, and at the same time, carrying out scan detection on at least one end of the first and second ends of the first conductive layer.

4. The method as claimed in claim 1, wherein the preset scan detection mode is the first operation mode and wherein when the preset scan detection mode is the first operation mode, the coordinates of the single-point touch or the multiple-point touch are simultaneously obtained during the scan detection operation.

5. The method as claimed in claim 1, wherein the preset scan detection mode is the second operation mode.

6. A touch position detection method for use in a touch control device that comprises a touch panel comprising a first conductive layer and a second conductive layer, the first conductive layer comprising a continuous planar structure formed on a first substrate and having first and second ends, the second conductive layer comprising a plurality of elongate conductive strips formed on a second substrate, the elongate conductive strips being substantially parallel to and not engaging each other, each elongate conductive strip having first and second ends, the first and second substrates being spaced from each other by insulation spacers, a control circuit electrically connected to the first and second conductive layers, and a microcontroller electrically connected to the control circuit, the method comprising the following steps:
   (a) the microcontroller initializing a preset scan detection mode to carry out driving and scan detection on the first conductive layer and the second conductive layer through the control circuit;
   (b) when detecting a touch operation applied to the touch panel, determining if the type of touch applied to the touch panel is single-point touch, multiple-point touch, or continuous trace;
   (c) when the type of touch being determined to be the multiple-point touch, the microcontroller employing a first operation mode to carry out driving on the first conductive layer and the second conductive layer as well as simultaneously performing the scan detection at said second conductive layer to detect the coordinates of the absolute touch positions;
   (d) when the type of touch being determined to be the single-point touch or continuous trace, the microcontroller employing a second operation mode to carry out driving on the first conductive layer and the second conductive layer and performing the scan detection at said second conductive layer to detect coordinates of a absolute touch position or coordinates of the absolute touch positions of the continuous trace; wherein said control circuit establishes a potential gradient in said first conductive layer or said second conductive layer when it is used as driving layer;
   (e) determining if the touch operation sustains for a given time period; and (f) returning to step (a) when the touch operation sustains for the given time period.

7. The method as claimed in claim 6, wherein the first operation mode comprises the following steps: (c1) applying a drive voltage to the first conductive layer; and (c2) carrying out scan detection on at least one end of the first and second ends of each elongate conductive strip of the second conductive layer.

8. The method as claimed in claim 6, wherein the second operation mode comprises the following steps: (d1) applying a drive voltage to the first end of the first conductive layer, the second end of the first conductive layer being connected to a preset voltage level to thereby establish a potential gradient in the first conductive layer, and at the same time, carrying out scan detection on at least one end of the first and second ends of each elongate conductive strip of the second conductive layer; (d2) applying a drive voltage to the first end of each elongate conductive strip of the second conductive layer, the second end of each elongate conductive strip of the second conductive layer being connected to a preset voltage level to thereby establish a potential gradient in the second conductive layer, and at the same time, carrying out scan detection on at least one end of the first and second ends of the first conductive layer.

9. The method as claimed in claim 6, wherein the preset scan detection mode is the first operation mode and wherein when the preset scan detection mode is the first operation mode, the coordinates of the multiple-point touch are simultaneously obtained during the scan detection operation.

10. The method as claimed in claim 6, wherein the preset scan detection mode is the second operation mode.

11. A touch position detection method for use in a touch control device that comprises a touch panel comprising a first conductive layer and a second conductive layer, the first conductive layer having a plurality of elongate conductive strips which are formed on a first substrate and substantially parallel to and not engaging each other and each has a first end and a second end, the second conductive layer comprising a plurality of elongate conductive strips which is formed on a second substrate and substantially parallel to and not engaging each other and each has first and second ends, the first and second substrates being spaced from each other by insulation spacers, a control circuit electrically connected to the first and second conductive layers, and a microcontroller electrically connected to the control circuit, the method comprising the following steps:
(a) the microcontroller initializing a preset scan detection mode to carry out driving and scan detection on the first conductive layer and the second conductive layer through the control circuit;
(b) when detecting a touch operation applied to the touch panel, determining if the type of touch applied to the touch panel is multiple-point touch, continuous trace, or single-point touch;
(c) when the type of touch being determined to be the single-point touch or multiple-point touch, the microcontroller employing a first operation mode to carry out driving on the first conductive layer and the second conductive layer as well as simultaneously performing the scan detection at said second conductive layer to detect the coordinates of the absolute touch position/touch positions;
(d) when the type of touch being determined to be the continuous trace, the microcontroller employing a second operation mode to carry out driving on the first conductive layer and the second conductive layer and performing the scan detection at said second conductive layer to detect coordinates of the absolute touch positions of the continuous trace; wherein said control circuit establishes a potential gradient in said first conductive layer or said second conductive layer when it is used as driving layer;
(e) determining if the touch operation sustains for a given time period; and (f) returning to step (a) when the touch operation sustains for the given time period.

12. The method as claimed in claim 11, wherein the first operation mode comprises the following steps: (c1) applying a drive voltage to each elongate conductive strip of the first conductive layer; and (c2) carrying out scan detection on at least one end of the first and second ends of each elongate conductive strip of the second conductive layer.

13. The method as claimed in claim 11, wherein the second operation mode comprises the following steps: (d1) applying a drive voltage to the first end of each elongate conductive strip of the first conductive layer, the second end of each elongate conductive strip of the first conductive layer being connected to a preset voltage level to thereby establish a potential gradient in the first conductive layer, and at the same time, carrying out scan detection on at least one end of the first and second ends of each elongate conductive strip of the second conductive layer; (d2) applying a drive voltage to the first end of each elongate conductive strip of the second conductive layer, the second end of each elongate conductive strip of the second conductive layer being connected to a preset voltage level to thereby establish a potential gradient in the second conductive layer, and at the same time, carrying out scan detection on at least one end of the first and second ends of each elongate conductive strip of the first conductive layer.

14. The method as claimed in claim 11, wherein the preset scan detection mode is the first operation mode and wherein when the preset scan detection mode is the first operation mode, the coordinates of the single-point touch or the multiple-point touch are simultaneously obtained during the scan detection operation.

15. The method as claimed in claim 11, wherein the preset scan detection mode is the second operation mode.

16. A absolute touch position detection method for use in a touch control device that comprises a touch panel comprising a first conductive layer and a second conductive layer, the first conductive layer having a plurality of elongate conductive strips which are formed on a first substrate and substantially parallel to and not engaging each other and each has a first end and a second end, the second conductive layer comprising a plurality of elongate conductive strips, which is formed on a second substrate and substantially parallel to and not engaging each other and each has a first end and a second end, the first and second substrates being spaced from each other by insulation spacers, a control circuit electrically connected to the first and second conductive layers, and a microcontroller electrically connected to the control circuit, the method comprising the following steps:
(a) the microcontroller initializing a preset scan detection mode to carry out driving and scan detection on the first conductive layer and the second conductive layer through the control circuit;
(b) when detecting a touch operation applied to the touch panel, determining if the type of touch applied to the touch panel is single-point touch, multiple-point touch, or continuous trace;
(c) when the type of touch being determined to be the multiple-point touch, the microcontroller employing a first operation mode to carry out driving on the first conductive layer and the second conductive layer as well as simultaneously performing the scan detection at said second conductive layer to detect the coordinates of the absolute touch positions;
(d) when the type of touch being determined to be the single-point touch or continuous trace, the microcontroller employing a second operation mode to carry out driving on the first conductive layer and the second conductive layer and performing the scan detection at said second conductive layer to detect coordinates of a absolute touch position or coordinates of the absolute touch positions of the continuous trace; wherein said control circuit establishes a potential gradient in said first conductive layer or said second conductive layer when it is used as driving layer;

(e) determining if the touch operation sustains for a given time period; and (f) returning to step (a) when the touch operation sustains for the given time period.

17. The method as claimed in claim 16, wherein the first operation mode comprises the following steps: (c1) applying a drive voltage to each elongate conductive strip of the first conductive layer; and (c2) carrying out scan detection on at least one end of the first and second ends of each elongate conductive strip of the second conductive layer.

18. The method as claimed in claim 16, wherein the second operation mode comprises the following steps: (d1) applying a drive voltage to the first end of each elongate conductive strip of the first conductive layer, the second end of each elongate conductive strip of the first conductive layer being connected to a preset voltage level to thereby establish a potential gradient in the first conductive layer, and at the same time, carrying out scan detection on at least one end of the first and second ends of each elongate conductive strip of the second conductive layer; (d2) applying a drive voltage to the first end of each elongate conductive strip of the second conductive layer, the second end of each elongate conductive strip of the second conductive layer being connected to a preset voltage level to thereby establish a potential gradient in the second conductive layer, and at the same time, carrying out scan detection on at least one end of the first and second ends of each elongate conductive strip of the first conductive layer.

19. The method as claimed in claim 16, wherein the preset scan detection mode is the first operation mode and wherein when the preset scan detection mode is the first operation mode, the coordinates of the multiple-point touch are simultaneously obtained during the scan detection operation.

20. The method as claimed in claim 16, wherein the preset scan detection mode is the second operation mode.

* * * * *